(12) United States Patent
Khayoyan

(10) Patent No.: US 12,437,346 B2
(45) Date of Patent: Oct. 7, 2025

(54) METHOD AND APPARATUS FOR MANUFACTURE AND SALE OF PRODUCTS

(71) Applicant: Stexcel Inc., Glendale, CA (US)

(72) Inventor: Jack Khayoyan, Los Angeles, CA (US)

(73) Assignee: Stexcel Inc., Glendale, CA (US)

( * ) Notice: Subject to any disclaimer, the term of this patent is extended or adjusted under 35 U.S.C. 154(b) by 212 days.

(21) Appl. No.: 18/234,294

(22) Filed: Aug. 15, 2023

(65) Prior Publication Data
US 2024/0062319 A1 Feb. 22, 2024

Related U.S. Application Data

(60) Provisional application No. 63/398,520, filed on Aug. 16, 2022.

(51) Int. Cl.
| | |
|---|---|
| *G06Q 50/04* | (2012.01) |
| *G06N 3/045* | (2023.01) |
| *G06Q 10/083* | (2024.01) |
| *G06Q 10/0835* | (2023.01) |
| *G06Q 10/0875* | (2023.01) |
| *G06Q 10/101* | (2023.01) |
| *G06V 10/82* | (2022.01) |

(52) U.S. Cl.
CPC ............. *G06Q 50/04* (2013.01); *G06N 3/045* (2023.01); *G06Q 10/0835* (2013.01); *G06Q 10/0838* (2013.01); *G06Q 10/0875* (2013.01); *G06Q 10/101* (2013.01); *G06V 10/82* (2022.01)

(58) Field of Classification Search
CPC ............... G06Q 50/04; G06Q 10/0835; G06Q 10/0838; G06Q 10/0875; G06Q 10/101; G06Q 10/06395; G06Q 10/08; G06Q 10/087; G06N 3/045; G06N 3/08; G06V 10/82; G06V 10/454
See application file for complete search history.

(56) References Cited

U.S. PATENT DOCUMENTS

| | | | |
|---|---|---|---|
| 7,689,465 B1* | 3/2010 | Shakes | G06Q 99/00 705/500 |
| 2002/0072824 A1* | 6/2002 | Susnjara | G05B 19/41865 700/171 |
| 2020/0104594 A1* | 4/2020 | Zucker | H04W 4/35 |
| 2020/0175124 A1* | 6/2020 | Ananthapur Bache | G06F 30/18 |

(Continued)

FOREIGN PATENT DOCUMENTS

JP 2002117251 A * 4/2002

*Primary Examiner* — A. Hunter Wilder
(74) *Attorney, Agent, or Firm* — Foundation Law Group LLP; JD Harriman; Sevag Demirjian

(57) ABSTRACT

The present system provides an integrated software solution for jewelry design, manufacturing, packaging, shipping, wholesaling, and online sales operations. The system provides a superior solution for tracking raw materials, waste, dust, and reclamation. That tracking information is used to support accurate pricing using all types of jewelry industry specific pricing schemes. The system integrates with cameras, scales, and the like, to provide a visually audited trail of a product from manufacture to shipping. Visual proof of insertion of a particular product into a shipping package allows sellers to dispute fraudulent claims of missing, damaged, or incorrect items. The visual information is tagged to an order and stored with the order in cloud storage to be easily retrieved by the system in the case of a dispute.

9 Claims, 16 Drawing Sheets

(56) References Cited

U.S. PATENT DOCUMENTS

2020/0402135 A1* 12/2020 Gabbai .............. G06Q 30/0625
2021/0312206 A1* 10/2021 Meidar ................. G06V 20/20

* cited by examiner

FIGURE 2

| IMAGE 201 | FOLDER 202 | CUSTOMER 203 | ORDER # 204 | SKU 205 | SHIPPING 206 | SOURCE 207 | DEADLINE 208 | STATUS 209 | ACTION 210 |
|---|---|---|---|---|---|---|---|---|---|
|  | F:13 | SMITH | 105679 | POT8439Z | 2$^{ND}$ DAY | EBAY | 9/14/23 | QC | CREATE LABEL |
|  | F:11 | JONES | 591632 | R4Y7759XX | STANDARD | AMAZON | 9/18/23 | WAX | PRINT UPS LABLE |
|  | F:57 | WILSON | 345879 | ROY1941ZW | EXPDTD | AMAZON | 11/17/23 | WORKSHOP | CREATE LABEL |
|  | F:20 | PARKER | 288286 | BOY668MTO | STANDARD | ALI BABA | 11/21/23 | WO CREATED | CREATE LABEL |

FIG. 3

English Template: JackAll 10K Yellow Gold Diamond Cut White CZ Watch Band
English Template: 10K Yellow Gold Diamond Cut White CZ Watch Band
Description
Keywords
Highlights — 401
BOM — 402

| Item | Quantity | Material | Component Type | Description / Shape / Length / Width | Plastic Mold Size / Item Type | Weight | Cut | Stone Type | Setting | Variation | Wax Set |
|---|---|---|---|---|---|---|---|---|---|---|---|
| CW-0A517-K | 1:00 | Wax | Sub Assembly | Description: Watch Lock | | | | | | | |
| CW-0A517-J | 1:00 | Wax | Sub Assembly | Description: Watch Lock | | | | | | | |
| CW-0A517-I | 1:00 | Wax | Sub Assembly | Description: Watch Lock | | | | | | | |
| CW-0A517-H | 1:00 | Wax | Sub Assembly | Description: Watch Lock | | | | | | | |
| CW-0A178-1(L) | 1:00 | Plastic | Sub Assembly | Description: Watch Lock | Plastic Mold Size: Large | | | | | | |
| CW-0A174-3(L) | 2:00 | Plastic | Large | | Description: Watch link / Item Type: Watch | | | | | | |
| CW-0A174-2(L) | 2:00 | Plastic | Plastic Mold Size: Large | | Description: Watch link / Item Type: Watch | | | | | | |
| CW-0A174-1(L) | 2:00 | Plastic | Plastic Mold Size: Large | | Description: Watch link / Item Type: Watch | | | | | | |
| CW-0A174-4(L) | 16:00 | Plastic | Plastic Mold Size: Large | | Description: Watch link / Item Type: Watch | | | | | | |
| CS-ZW03t0x1300tR-RG | 27:00 | Stone | Shape: Round | Length: 3:00 | Width: 3:00 | 0.0415 | Regular | White CZ | Prong | No | Yes |
| CS-ZW0350x0350R-RG | 44:00 | Stone | Shape: Round | Length: 3:50 | Item Type: 3:50 | 0.0637 | Regular | White CZ | Prong | No | Yes |

Total Stone Weight: 3.9233 grams
Total Metal Weight: 35.4567 grams
Total Stone Count: 71

Department Dust Report

Select Start Date | Select End Date 2021-11-17-2021-11-17 801

Casting: 37.7 %
Grinding: 49.4 %
Polishing: 14.4 %
Stone Setting: -1.1
Diamond Cut: 88.3 %
Rhodium: 1
Cutting: -0.3 %
Tumbler Clean: 3.1 %

802

| Batch# | Weight | Metal |
|---|---|---|
| Batch: 2299 | 7.00 | 14k |
| Batch: 2296 | 26.70 | 10k |
| Batch: 2304 | 5.40 | 10k |
| Batch: 2271 | 10.30 | 14k |
| Total Weight | 49.4 | |

51.90 grams Grinding Dust Reclaimed

FIG. 8

| Add New Casting Tree | | |
|---|---|---|
| Tree# | 12 | |
| Order# | 555 | |
| Metal Type | 10k Gold | |
| Metal Color | Yellow | |
| Employee | Kris | |
| Stone In | 5 | |
| Grams Required | 450 | |
| Scrap In 1 | 100 | 10k Gold |
| Scrap In 2 | 200 | 14k Gold |
| Scrap In 3 | | |
| 24k Gold | 29.2 | |
| MGD Yellow Alloy | 120.8 | |
| Total Metal Mixture: | 150.0 | |

Submit

Starting 24k Gold Balance: 107.80
24k Gold Balance After Casting: 78.00

901

Scan Wholesale WO Ticket [Scan WO Ticket]
Scanned Tickets: 0

FIG. 9

New Invoice

Customer: Jewelry Liquidation, Inc.

Type: Invoice  Terms: Net 30  Gold (Nov 18) 1860.30  Silver (Nov 17) 25.04  Invoice Date 11/18/2021  ☒ Gold & Labor
Gold Premium 25.00  Silver Premium 1.00

Notes
Order Notes

Add Line Item  Add Order  1004

| SKU | Metal Type | Metal Color | Description | Pieces | Weight [g] | Unit Price Gold+Labor | Pricing Method | Total Price | Metal Balance |
|---|---|---|---|---|---|---|---|---|---|
| R2194 | 10k gpd | Yellow | 10k Ring | 10 | 50 | 3.00 / 28.26 | ✓Labor / Place / Place+Metal / Place+Metal Value | 150.00 | |
| | | | | 10 | 50.00 | | | | |

1001

Subtotal: 150.00
Shipping: 0.00
Other Charges: 0.00
Total: 150.00

Remove  Add Line Item

Save Draft | Save & Issue

METHOD AND APPARATUS FOR MANUFACTURE AND SALE OF PRODUCTS

This patent application claims priority to U.S. Application 63/398,520 filed on Aug. 16, 2022, which is incorporated by reference herein in its entirety.

BACKGROUND OF THE SYSTEM

Manufacturing and selling of products is a complex process that requires detailed information on raw materials, production schedules, wastage, packaging, shipping, returns, and a myriad of other problems that must be solved to have an efficient manufacturing process. This is particularly true in the jewelry industry or any industry that uses expensive materials, such as precious metals, gemstones, and the like. When working with precious metals, there is typically a certain amount of loss that occurs during the manufacturing process. There is an effort to track and collect scrap and dust of precious metals for reclamation and re-use. The reclaimed metal must be assayed for purity to know how it can be re-used.

Accurate pricing in any business is critical to maximize margins. It is particularly important in the jewelry business, where there are a number of jewelry industry specific methods of pricing products. For example, a wholesaler can charge in gold premiums, pricing labor, and gold by gram, pricing by piece plus metal value, and pricing in labor and gold (where the customer pays the labor portion in currency and the remainder in gold).

Jewelry pricing schemes can vary depending on various factors, such as the type of jewelry, the quality of materials used, the intricacy of design, and the location of the jewelry store. Here are some common pricing schemes that incorporate gold premiums, labor costs, and metal value:

Gold Premiums: Gold premiums refer to the additional cost added to the current market price of gold to account for market volatility, and dealer costs. The gold premium is usually calculated as a fixed dollar amount above market price.

Pricing Labor and Gold Separately: Under this scheme, the cost of labor and the cost of gold are calculated separately. The labor cost is based on the amount of time and skill required to create the piece of jewelry. Jewelers often charge an hourly rate or a fixed fee for the labor involved in making the jewelry. The gold cost is determined based on the weight of the gold used in the piece, multiplied by the current market price of gold per unit of weight. The total price of the jewelry is the sum of the labor cost and the gold cost.

Pricing by Piece Plus Metal Value: In this method, the jewelry piece's price is determined by adding the cost of materials (gold, silver, or other metals) used in making the jewelry to a fixed price for the labor and design per piece. The fixed price for labor and design can be based on factors like complexity, time, and the skill level required to create the piece.

Pricing in Labor and Gold, Considering Design Complexity: This pricing scheme takes into account both labor and gold costs, as well as the complexity of the design. Jewelers may use a formula or a set of criteria to assess the intricacy of the design and add an appropriate premium to the labor and metal cost.

It's important to note that the final pricing of jewelry can also include other factors like gemstone costs (if applicable), overhead expenses, and profit margins for the jewelry store. Additionally, market demand, exclusivity, and brand reputation can influence the pricing of high-end jewelry pieces.

Although these pricing approaches are relatively common, there is no integrated solution that can accommodate all of the pricing schemes into a manufacturing system.

Another problem in manufacturing and selling is buyer fraud. Some buyers report empty boxes, incorrect items, and/or damaged items. There is no good way to track an individual product from manufacture, to packaging, to shipping with back up auditing all along the way.

Another problem in manufacturing and selling is matching a desired end product desired by a buyer or manufacturer. This involves product recognition techniques such as reverse image search, SKU lookup, Vendor catalogs, and the like. However, there are many times when such information is not available, yet it is still desired to identify a product and be able to source it or reproduce it as desired.

In the prior art, there have been software implemented systems used to track a limited number of components that are used in the jewelry business. A disadvantage is that these systems are directed to buyers and sellers of jewelry, and not in manufacturing. The lack of an integrated system has led to manufacturers using a combination of spreadsheets and generic (non-jewelry specific) manufacturing software to keep track of production, with a separate system for wholesale sales, and still another system for implementing online sales (e.g., Amazon and other marketplaces and sales channels).

SUMMARY

The present system provides an integrated software solution for jewelry design, manufacturing, packaging, shipping, wholesaling, and online sales operations. The system provides a superior solution for tracking raw materials, waste, dust, and reclamation. That tracking information is used to support accurate pricing using all types of jewelry industry specific pricing schemes. The system integrates with cameras, scales, and the like, to provide a visually audited trail of a product from manufacture to shipping. Visual proof of insertion of a particular product into a shipping package allows sellers to dispute fraudulent claims of missing, damaged, or incorrect items. The visual information is tagged to an order and stored with the order in cloud storage to be easily retrieved by the system in the case of a dispute.

BRIEF DESCRIPTION OF THE DRAWINGS

FIG. 2 is an overview of sale tracking in an embodiment of the system.

FIG. 3 illustrates an item page in an embodiment of the system.

FIG. 4 illustrates the tracking of components for an item in an embodiment.

FIG. 5 illustrates detailed component descriptions in an embodiment.

FIG. 7 illustrates a workshop view in an embodiment of the system.

FIG. 8 illustrates gold dust tracking in an embodiment of the system.

FIG. 9 illustrates casting calculation in an embodiment of the system.

FIG. 10 illustrates wholesale invoice pricing options in an embodiment of the system.

FIG. 11 illustrates an invoice calculation with separate gold and labor calculations in an embodiment of the system.

DETAILED DESCRIPTION OF THE SYSTEM

The system provides a complete software solution for any manufacturing process. In the description below, the system is described in connection with jewelry manufacturing, shipping, and sale. It should be understood that the system can apply to any manufacturing type without departing from the scope and spirit of the present system.

Figure 1:
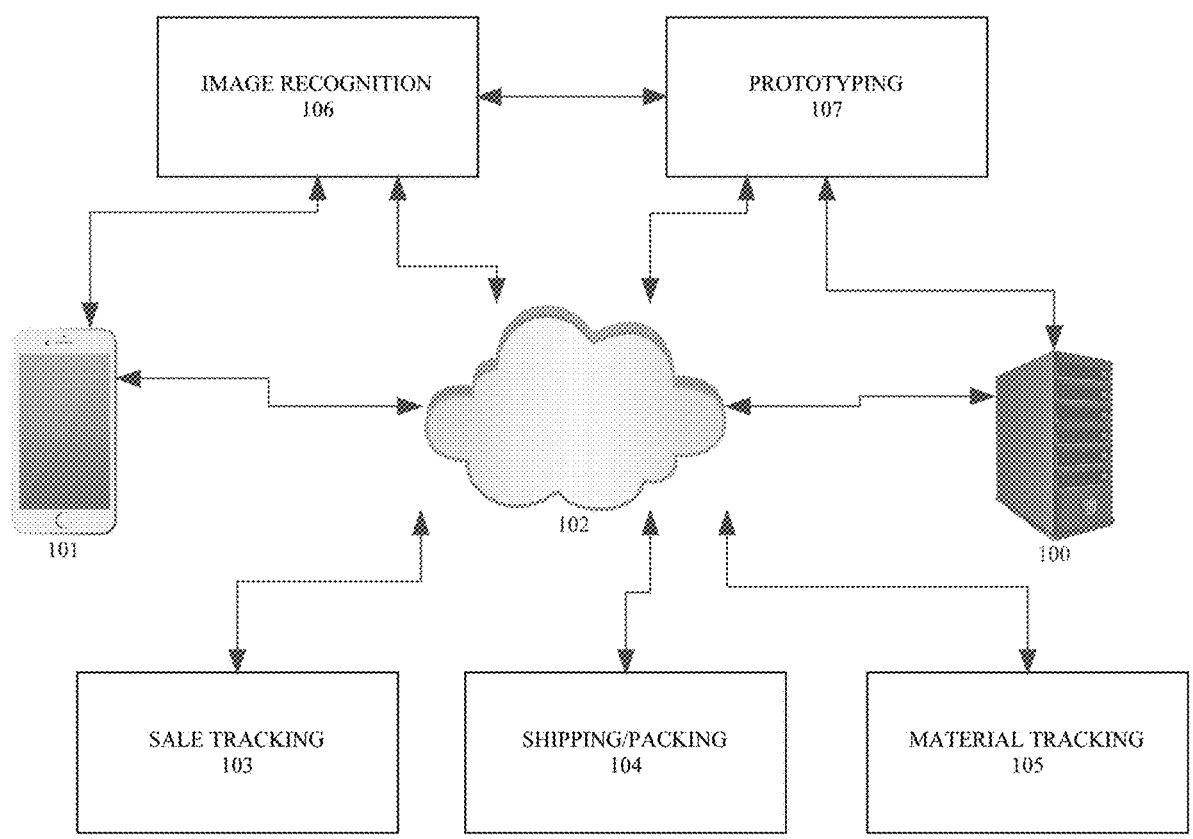
FIG. 1 illustrates a block diagram of components of the system in an embodiment.

FIG. 1 illustrates a block diagram of components of the system in an embodiment. The system includes software and instructions that can be implemented on a server system 100 or mobile device 101, with communication through network cloud 102. The system includes sale tracking module 103, shipping/packing module 104; material tracking module 105, image recognition module 106, and prototyping module 107.

Sale Tracking 103

The sale tracking module 103 is configured to handle the ordering and manufacture of products, for example, jewelry pieces for retail and wholesale transactions. The module can manage B2C sales and B2B sales. The sale tracking module 103 tracks the customer, the piece being produced, the SKU of the piece, the source of the order, deadlines and the like. The sale tracking module 103 tracks the status of each piece and indicates the next action to be taken for each piece.

FIG. 2 illustrates an overview of sale tracking in an embodiment of the system. This is presented to the manufacturer to provide complete transparency of retail orders. In one embodiment, the view includes the columns Image 201, Folder 202, Customer 203, Order #204, SKU 205, Shipping 206, Source 207, Deadline 208, Status 209, and Action 210. The table can be sorted by any of the columns as desired. Other columns and data may be included as well.

The Image 201 represents the item being manufactured. The manufacturer will offer items for sale in a retail environment, with images associated with each item. The presence of the image makes it easier to know what item is being tracked. The Folder column 202, also known as a "Location ID" is used to define the physical location where all documentation associated with an order will be stored. The number is printed on most documents to allow them to be easily sorted out when being printed. The Customer 203 is the name of the Customer who placed the order, followed by the Order #204. Each item has a SKU 205 that is used to track the style, color, gem type, etc. of the item.

The Shipping column 206 represents the manner of shipping requested (and paid for) by the Customer 203. This can include Standard, Second Day, Expedited, and the like. The Source column 207 identifies the source of the retail sale, e.g., eBay, Amazon, etc. In the background, the system provides the requested interface and information required by that particular retail channel automatically, so that the manufacturer does not need to spend time adjusting information for each channel of trade.

The Deadline column 208 indicates when the product is due to be shipped. This helps the system manage scheduling of manufacture so that deadlines are met. The Status column 209 indicates where in the manufacturing process the item is presently. In one embodiment, the status indicators are:

WO Created—This is the first status, the work order has been created, but not yet printed and no work has been done.

WO Printed—This lets us know we printed a work order, but so far it hasn't entered into any department.

Wax Department—This is the first step in the manufacturing process where the mold is located and a wax/resin model created.

Casting Department—After the models are made, the items are sent to be cast.

Workshop—After casting, they enter the workshop for finishing.

Enamel—This is a part of the production workflow on some items that require enamel painting work done on it.

Outside Setter—If the in-house setter is out or overwhelmed, work can be contracted to outside setters.

Outside Laser—Similar to outside setter, but with laser soldering work.

Pre-Inspection—This is used when an item is picked from stock—not newly manufactured (for example from a previous sale's return). The product will go into-pre inspection to make sure it's viable. If it's good, then it'll be accepted into Quality Control—if not, it will be sent into the factory.

Quality Control—Once an item is ready, it is weighed and accepted from the factory and enters QC. This is where the item is inspected for defects and checked to make sure it is exactly as pictured online. This can be done by printing out a Quality Control paper, or digitally using a tablet. If done digitally, the digital version is automatically saved. If printed on paper, a standard or high speed scanner is used to scan the completed QC document and it is uploaded back into the system.

Ready for Fulfilment—This means the item has passed the QC stage and is ready to be fulfilled.

Being Packaged—This is the status it has while the shipment is being fulfilled and recorded.

Ready for Fulfilment—This is the status it has after a quality control inspection has been performed and the item has been approved for fulfilment.

Packed & Ready to Ship—The item is packed and ready to be handed off to the shipping carrier.

The Action column 210 indicates actions that can be taken related to the order. In one embodiment, the Action column includes:

Edit Order—edit order details. After placing an order, a customer can send a request for a different size, different gem, etc. This action item allows the order to be updated.

Print Work Order, Invoice, Certificate—If any of the documents get damaged or don't print well, we can reprint an individual one from here. There is also a different screen where we can select multiple orders and print (or reprint) them all together.

Cancel Order—Cancel the order and let the factory know to stop working on the item. If someone tries to fulfil a cancelled order, the system will prevent it and send a warning/notification out. Same if the cancelled order item is attempted to be moved from one department into another.

The Status indicators are customizable and can easily be modified by a user.

The sale tracking module 103 presents interfaces to the users that make the manufacturing process simpler and fully integrated.

Figure 3:
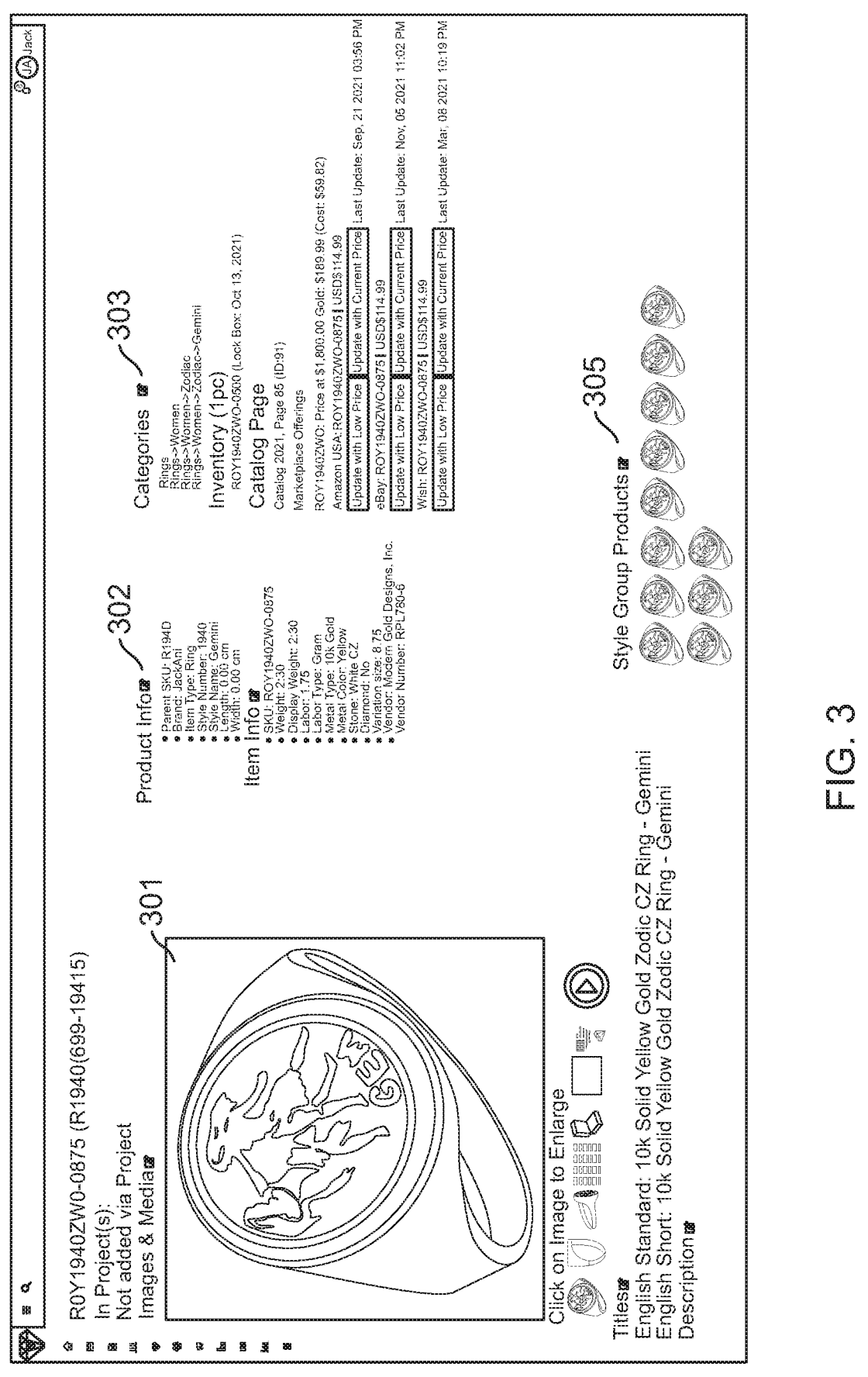

FIG. 3 illustrates an item page interface in an embodiment of the system. The system includes an image 301 of each item along with videos and other images of the item that can be selected and viewed. Region 302 includes product information including part numbers, style, SKU, dimensions, composition, and the like. Region 303 includes manufacturer information such as category, inventory, catalog page, and the like. Region 304 is particularly useful as it shows the marketplaces where the item is offered (such as eBay, Amazon, Wish, and the like). Region 305 is the Style Group section. If an item has related products that belong together, this section will show those items. For example, in the photo provided, it's a zodiac ring for Gemini. The style group includes the rings for other signs of the zodiac. Likewise with an initial ring, every initial ring has its own unique SKU, but they will all be grouped together since many times they're sold together. Users can decide how they would like to group products.

FIG. 4 illustrates the tracking of components for an item in an embodiment. This allows the system to easily and automatically create the bill of materials (BOM) for each product, allowing more accurate pricing, ordering, manufacturing, and inventory control. Region 401 lists the code numbers (or names) for each component in an item. Region 402 includes more detail about each component including quantity, material, component type, and other appropriate data (such as weight, color, stone type, setting and the like for gemstones, for example).

Figure 5:
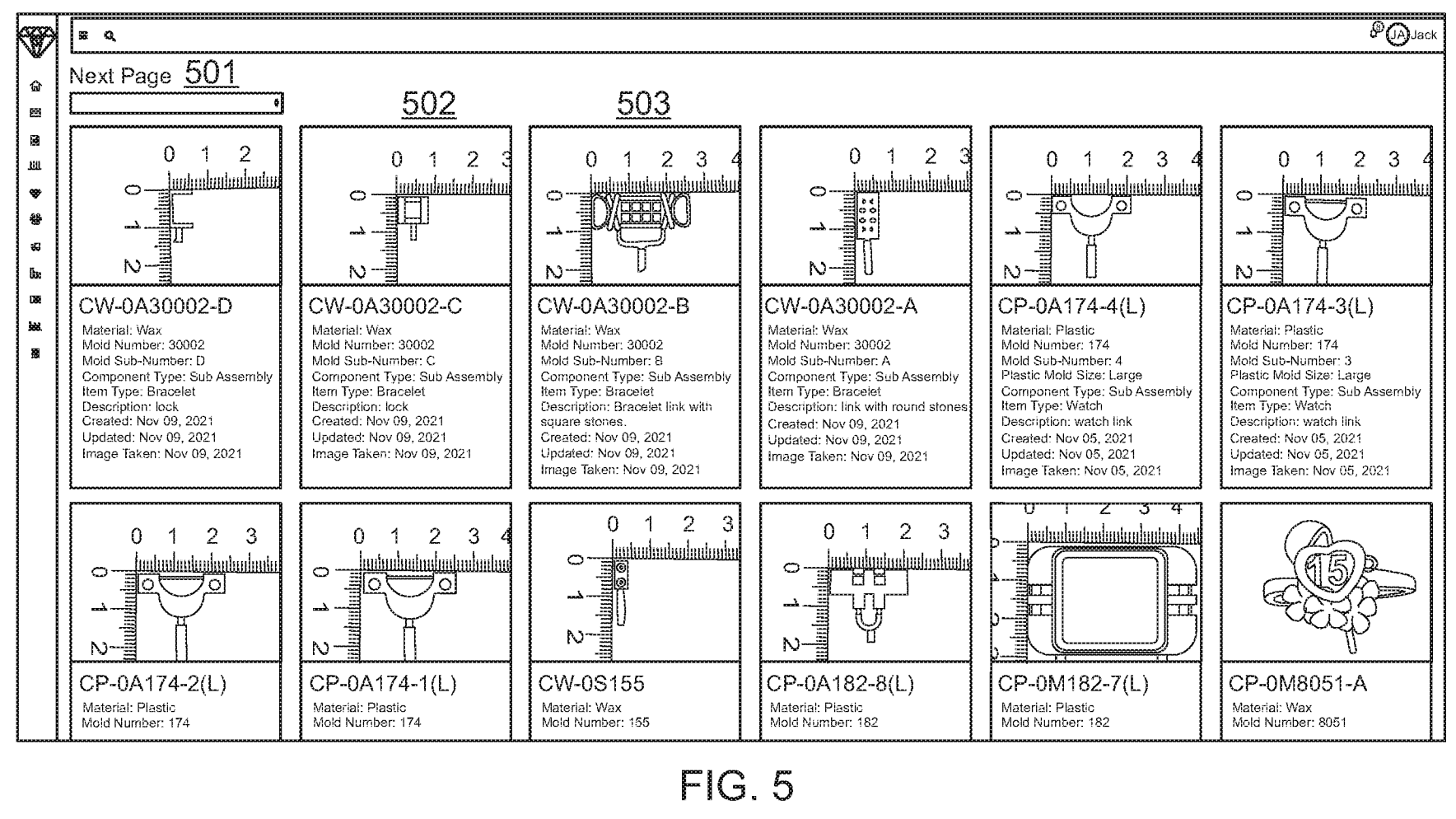

FIG. 5 illustrates a component page where a user can view all the components and use the top section to filter/search through them. For example, components 501 and 502 are lock subassemblies. Item 503 is a bracelet link for four square stones.

Figure 6:
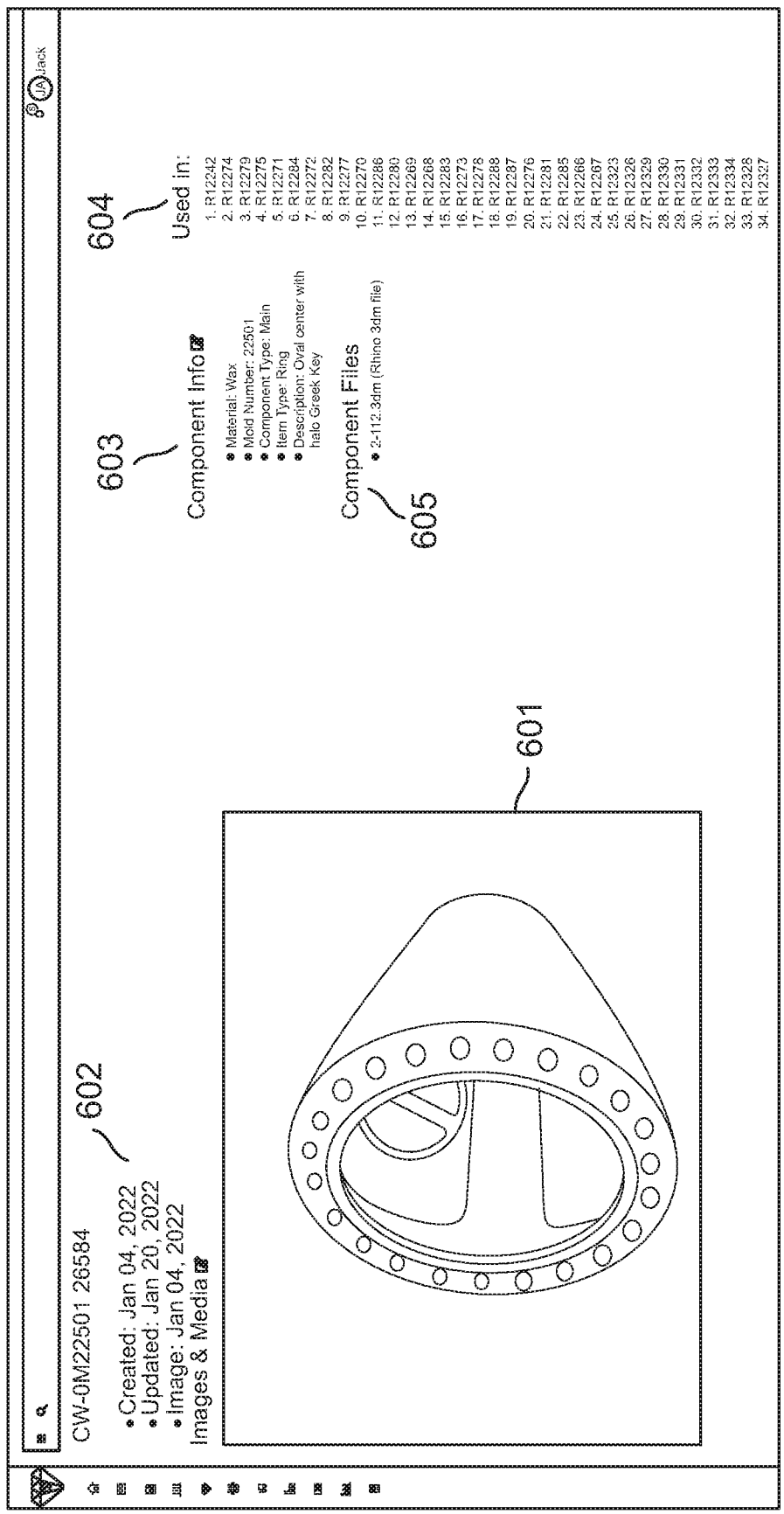
FIG. 6 is a detailed view of a component.

Clicking on the component in the BOM of FIG. 4 or clicking on a component in FIG. 5 will display the specific component detail page (as shown in FIG. 6). There you can see that specific component in region 601 and all the information surrounding it in region 602, such as when it was created, photographed, details on the type of mold in region 603, which product(s) it is used in in region 604, and if the component was made using 3D software, it can also contain the 3D CAD file in region 605.

Figure 7:
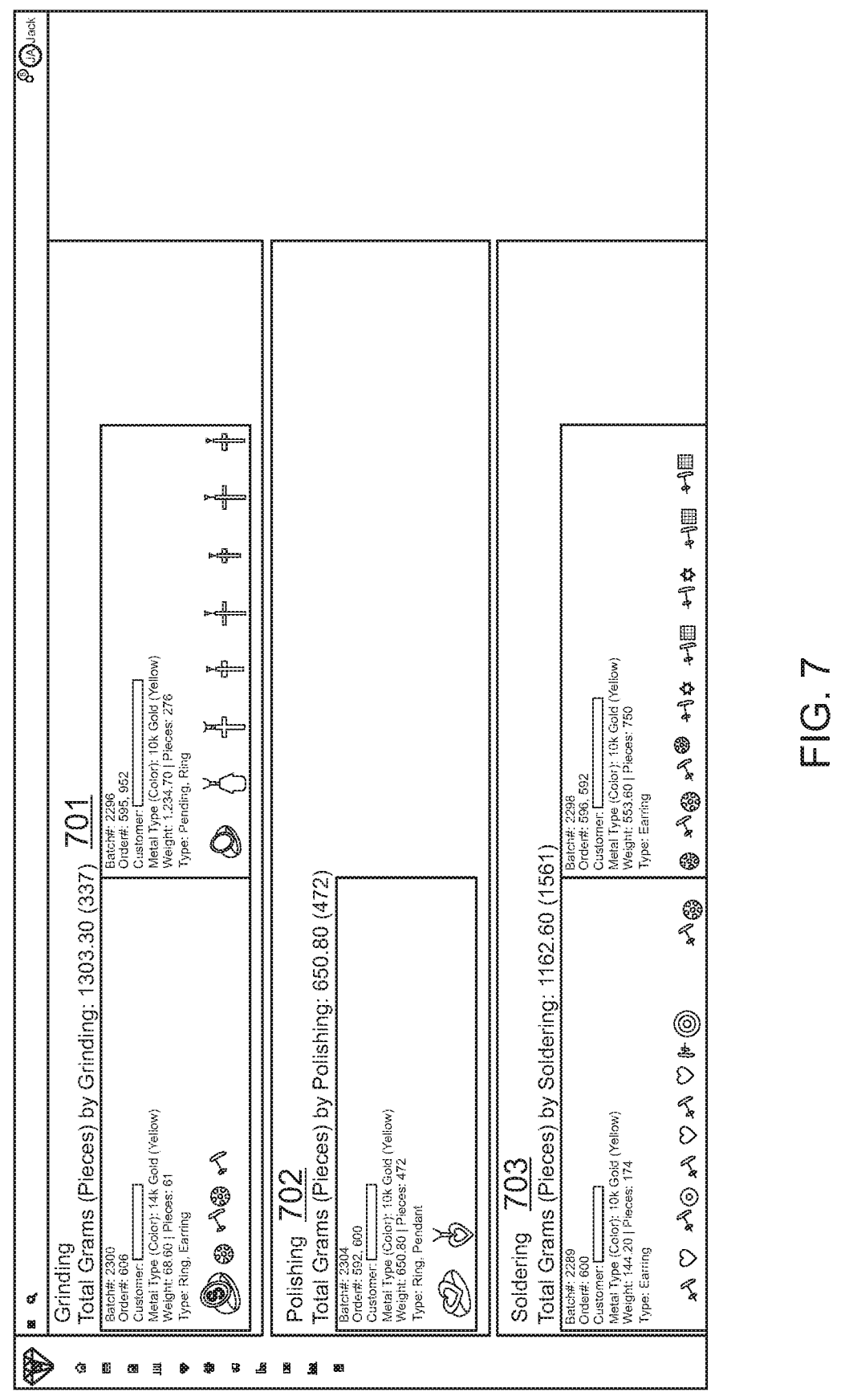

FIG. 7 is a useful workshop view in an embodiment of the system. This view shows the location of all of the products grouped into batches. Region 701 shows two batches that are in the Grinding area of the workshop. Region 702 shows a batch in the Polishing area of the workshop. Region 03 shows two batches in the Soldering area of the workshop. Other areas include Casting, Cutting, Tumbler, Grinding, Polishing, Stone Setting, Soldering, Assembly, Diamond Cut, Rhodium, Enamel, Opal, Quality Control, New Model Work, Melting, Safe, and the like. Any batch locations/departments can be added as these are fully customizable. If a factory produces laser cut jewelry for example, they can add a department for laser cutting to move the jewelry in/out of the workshop. The system tracks the batch history of each batch, to show what processes it has gone through.

Material Tracking 105

Material tracking module 105 is used to track raw materials used in the manufacturing process and to prevent loss of expensive materials such as gold. During jewelry manufacturing, gold metal is used and is subjected to grinding, cutting, and other process that can create scrap, leavings, dust, and the like. This material can be collected and reclaimed, for use in manufacturing other pieces.

The system uses the batch history data to track how much gold dust or other loss there should be in each department as shown in FIG. 8, so that the gold dust can be properly collected from employees as required. Region 801 shows each department and the total dust for the day or relevant time period. By selecting one of the entries in region 801, a more detailed report is shown in region 802, with the weight and metal for each batch in that department is presented. The system can use statistical analysis to compare results with historical information and send an alert if amounts are out of an expected range.

In one embodiment, when mixing metals for casting, there is a security risk that the individual who does the casting can steal small amounts (e.g., grains) of gold, weighing for example 0.1 or 0.2 grams. If the employee steals just 0.2 grams of gold per casting, and does this for each casting, in a scenario where there are 20-25 per day, the employee can take 5 grams of gold daily which amounts to over $300.00. This theft would be nearly unnoticeable since 0.2 grams within a tree of 300+ grams is well within the margin of error in casting and the karat difference would be difficult to identify.

Figure 16:
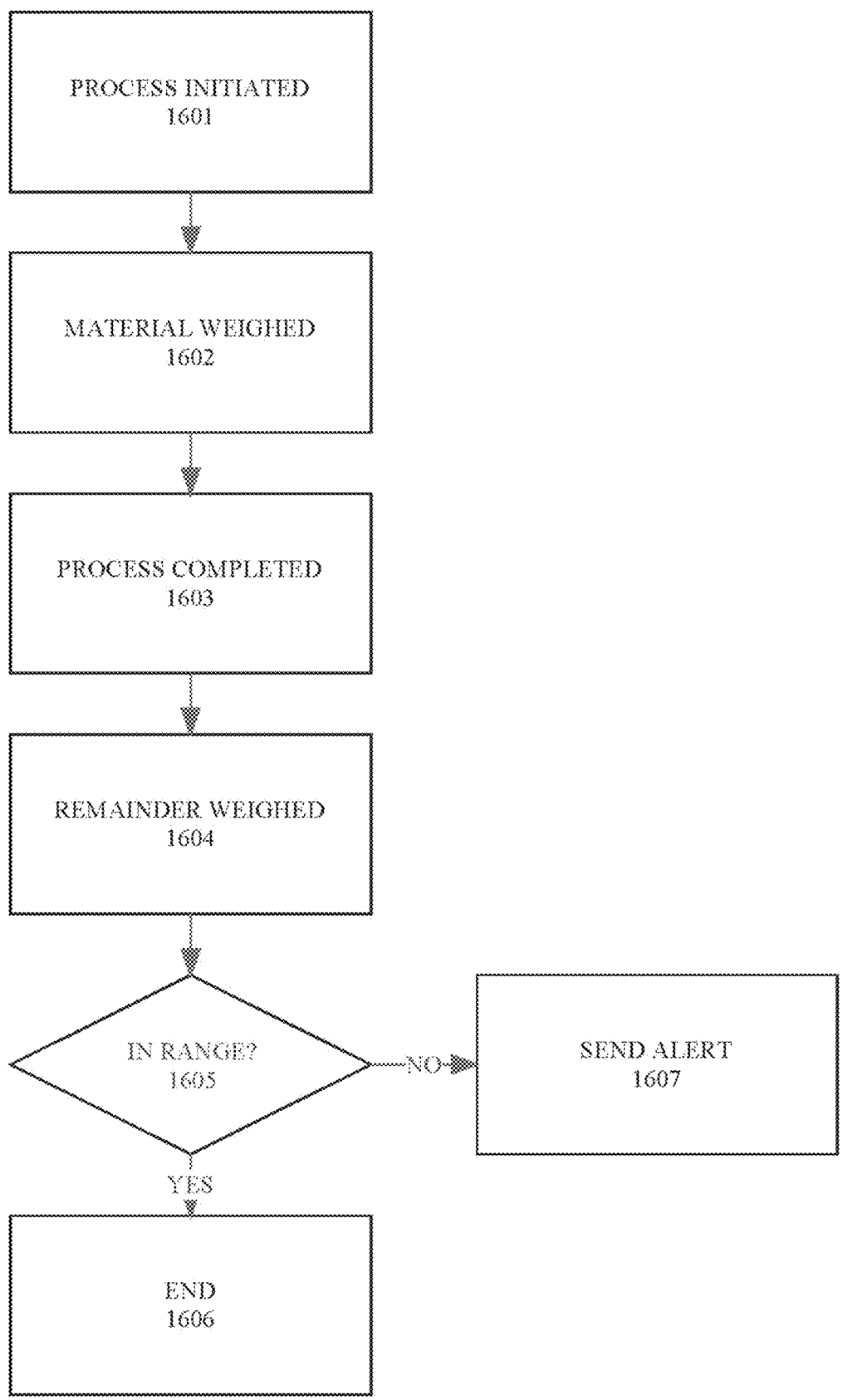
FIG. 16 is a flow diagram illustrating material tracking in an embodiment of the system.

The system tracks gold & other precious metal usage for all steps and keeps historical records in a database in the system. Over time, the system can determine the expected remainder of metal that will be present when a certain amount of metal is provided at the beginning of a process. This data is maintained for each process and tracked whenever a process is performed. FIG. 16 is a flow diagram illustrating the operation of statistical analysis in an embodiment of the system.

At step 1601 a process using a material to be tracked (e.g., gold) is begun. At step 1602 the starting amount of material is weighed and the weight is stored in the system along with meta data about the process. At step 1603 the process is run and completed (e.g., one or more pieces are manufactured). At step 1604 the remainder of material is weighed.

At decision block 1605 it is determined if the remainder is in the expected range based on historical data. If so, the system ends at step 1606. If not, the system sends an alert at step 1607 to report the anomaly. In one embodiment, if the remainder is more than one standard deviation out of range, an alert is sent. It should be noted that the system can respond to either too little or too much remainder. The out of range data is not included in the statistical analysis database in one embodiment.

In one embodiment, the system implements a lockbox. After weighing the metal mixture and preparing it, the user will place it in the lockbox, and enter into the system which box it went into by an ID number. The employee who does the casting would then take the locked box to the casting room and prepare the casting machine. Once that employee is ready to pour the metal in, they will scan the batch ticket into a barcode reader, which will turn on a camera and display the passcode of the box—which is rotated periodically (e.g., every 30 seconds). Each box will have its own unique code that is rotated periodically—similar to a two factor authentication system. That way, the person doing the casting will have no opportunity to steal even a small amount of gold.

As noted, the reclaimed scrap can be used in manufacturing. FIG. 9 illustrates how much pure gold is required to reach a target purity when reclaimed gold is being used. The system allows recycled gold of various purity levels to be used. By inputting the amount and purity of each recycled material, the system can determine how much pure gold should be added to the casting to reach a desired purity.

Although gold is discussed by way of example, the system can handle any metal type, rather than just gold, including platinum casting, silver, brass, and the like. The system can be customized by creating a casting metal in the system and defining its formula. For example, consider a platinum alloy that uses 95% platinum and 5% iridium, another that uses 90% platinum and 10% iridium, and a third allow that uses 95% platinum and 5% ruthenium. The system can define these formulas, and when it is time to cast, it will select what types of scrap that are acceptable to use for the casting. For example, if you want to cast something as a 90% platinum and 10% iridium alloy, the system will define how much you need of each, and will allow you to use a 95% platinum/5% iridium scrap, but won't allow the 95% platinum/5% ruthenium scrap to be mixed.

In manufacturing, a casting tree is utilized so that multiple items can be cast at the same time. For example, there could be a casting tree of rings of a certain size. Region 901 identifies the tree number to be cast, and includes the ability to define multiple scrap materials to be included in the cast. In the example of FIG. 9, the system shows that 100 grams of 10K gold, and 200 grams of 14K gold are being recycled. The system is told it needs to create 450 grams of 10K metal for the casting. The system calculates that 29.2 grams of 24K gold and 120.8 alloy will be combined with the 300 grams of recycled scrap to result in the 450 grams of 10K gold for the casting. Note that there may be a number of different alloys depending on the precious metal and even on multiple types of that metal (e.g., multiple types of 14K gold).

Shipping/Packing 104

Figure 11:
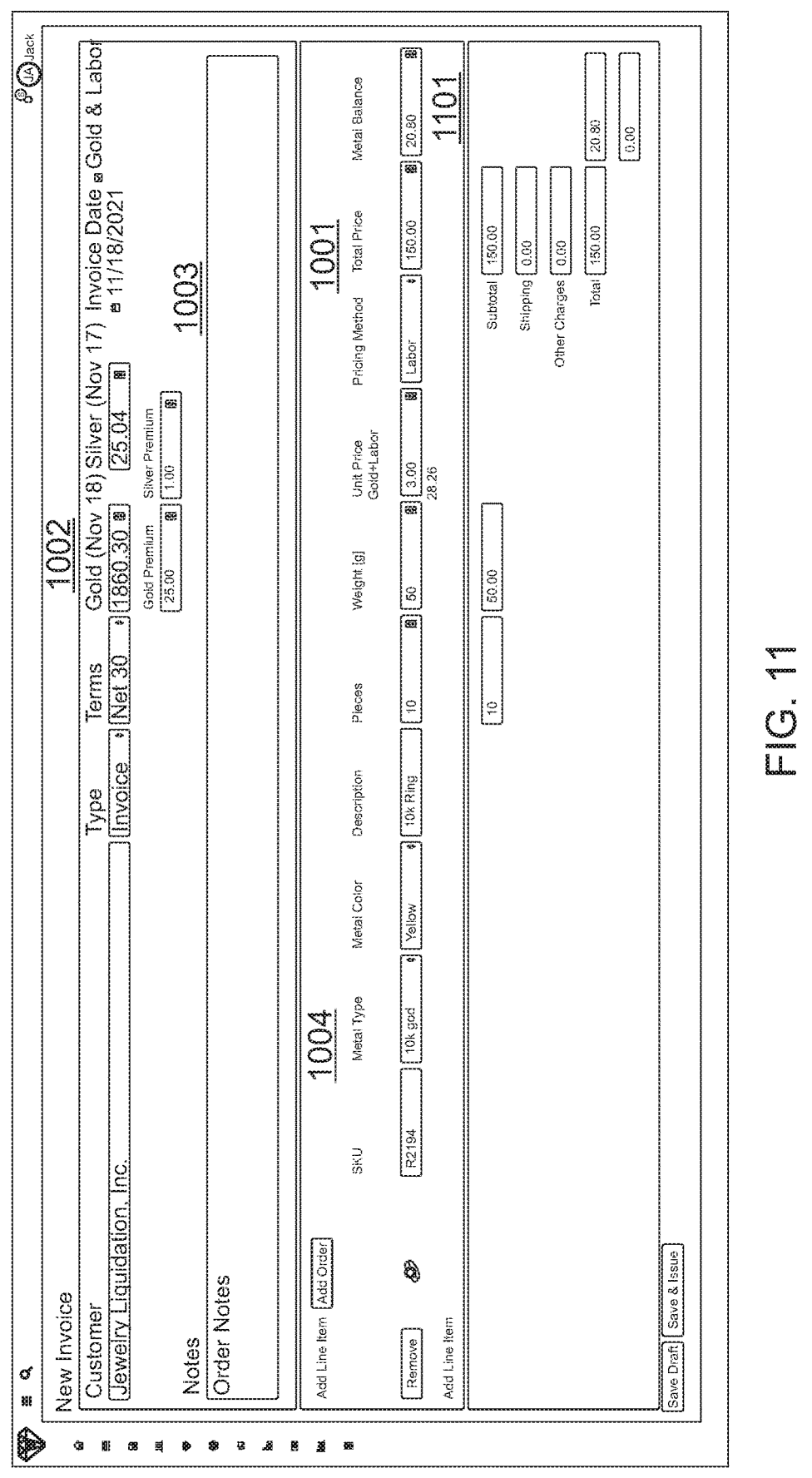

The Shipping/Packing Module 104 handles invoicing, packing, and shipping of products from the manufacturer to the customer. One of the advantages of the system is the ability to generate invoices from a plurality of pricing schemes, including gold premiums, pricing labor, and gold by gram, pricing by piece plus metal value, and pricing in labor and gold. The system can generate invoices using multiple jewelry specific pricing methods as desired, as shown in FIGS. 10 and 11. The system is coupled to databases that provide either real time, or LBMA daily, prices of gold, as well as gems, and other materials so that accurate pricing can be implemented. The system allows a premium to be defined on an invoice by invoice basis, to protect against price volatility in the markets.

Referring to FIG. 10, the tool for pricing is illustrated in an embodiment. The tool includes a region 1002 that is populated with current gold and silver pricing information. Region 1003 includes the gold and silver premium that is set by the manufacturer or set in cooperation between the manufacturer and the customer. The region 1004 populates the parameters of the piece to be priced using the SKU or other information stored in the system database. The manufacturer then uses the pull down menu 1001 to select the pricing to be applied to the piece and the tool calculates the price automatically and generates an invoice. In the example of FIG. 10, the manufacturer has chosen Labor pricing and the invoice is for $143.00.

FIG. 11 illustrates an embodiment where pricing is selected for labor with separate gold calculation. In this example the customer will owe $150.00USD and 20.8 grams of pure gold. The metal owed is shown in region 1101.

The system can automatically handle master carton shipping, when required. Some marketplaces, usually international, require shipping items using a specified shipping service to handle various stages of the delivery process, and require the use of multiple labels. For example, when shipping from the US to Canada, a Canada Post shipping label may be required on an outbound package. Multiple packages to be delivered in Canada are then packed into a box, i.e., a master carton. A different shipping company, such as FedEx, is used to get the master carton across the border to an induction facility. The induction facility then processes the individual packages found in the master carton. The system has a feature that can identify orders that are eligible for such shipping, and automatically add them under a "Master Carton" shipping label to allow the user to track the order using multiple tracking numbers from the moment it leaves their facility to delivery.

The system also integrates with cameras at every station in the factory, including packaging and shipping. Video data includes meta data related to the item being made, such as SKU, serial number, and the like. When packaged, the video shows the item being placed in the package, sealed, and the shipping label being attached. In this manner, a customer who claims that an incorrect item was sent, or that an item was missing, can be challenged with video proof of packaging. In one embodiment, items are tracked via a barcode that gets scanned in. Once it's time to ship the product, the work order is scanned and that triggers a camera to turn on. It records the packaging of the item, then when done, the work order is scanned again, which turns the camera off, processes it, uploads it to the cloud, and tags it to the order. It also does a check during the scan to make sure it's eligible for shipping. For example, if the item status is cancelled, it won't turn on and will send a notification for handling. If the item has not yet been through quality control it can't be shipped. Similarly, the system will record the opening of packages that are returned by a customer to ensure that a promised return is actually made.

Image Recognition 106

A problem for current product recognition systems is the reliance on image searching, or the requirement of bar codes, QR codes, serial numbers, RFID chips, or some other indicator to provide positive identification of a product. There are times when a customer sees a product, does not know who the manufacturer is, but would nevertheless desire to purchase the same product. The system incorporates Artificial Intelligence ("AI") training that allows the mobile app to quickly and efficiently identify the specific items of one or more vendors.

Figure 12:
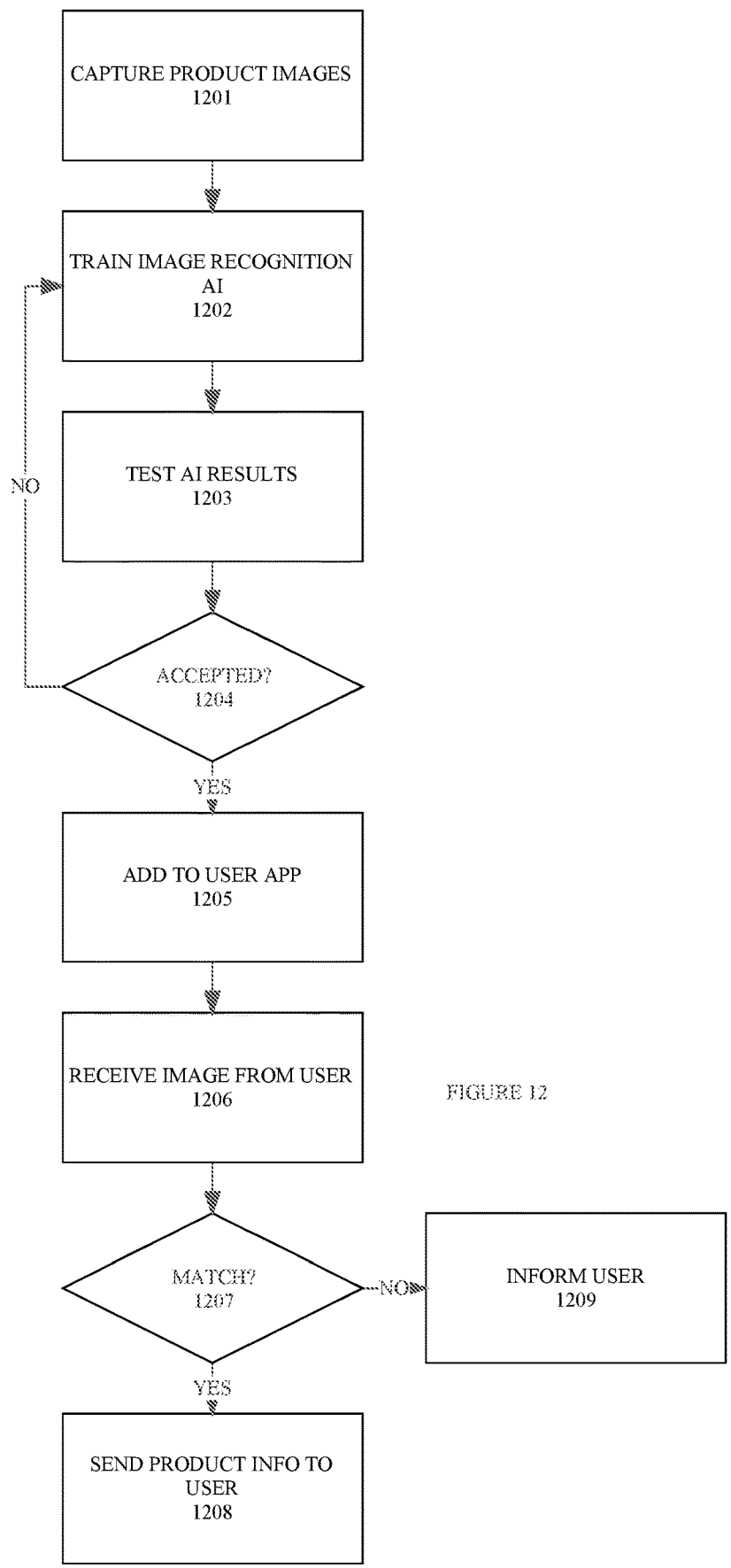
FIG. 12 is a flow diagram illustrating the training of an AI system for product recognition in an embodiment.

To train the AI of the system for product recognition, the steps of FIG. 12 are used in an embodiment. At step 1201 the system captures images of the products to be provided to the AI. At step 1202, the AI is trained in image recognition of the products. At step 1203 the AI results after training are tested. At decision block 1204 it is determined if the training has been successful. If not, the system returns to step 1202 for continued training.

In one embodiment, the image capture is done by different people with different cameras and each chooses their own angles and views of the product. This provides a randomized library of images for training of the AI. This improves the efficiency of the AI because the images that will be provided from real world users will also be random in terms of position, distance, lighting, angle, direction, and the like. By providing the training images in this manner, a practical solution is provided to result in a highly accurate product recognition system. The images captured are uploaded to the system where they are tagged and validated.

If the results are acceptable at step 1204, the system adds the product to the database that is accessible to the user image recognition app. At step 1206 the system receives an image for recognition from the user and detects the article of jewelry and removes the background from the product by cropping it out. This is accomplished in one embodiment using a convolutional neural network (CNN). The images are broken down by pixel and numerical values are assigned based on color, intensity, and the like. A convolution operation is applied to generate a feature map using a feature detector. In one embodiment the CNN applies activation functions and transformations, including Rectified Linear Unit (ReLU), Pooling, Dropout Regularization, Flattening, and the like.

At decision block 1207 it is determined if there is a match of the product using the AI image recognition. If so, the product information is provided to the user at step 1208. If no match is made, the user is informed at step 1209.

In one embodiment, the matching is implemented using a K Nearest Neighbor (KNN) algorithm. The KNN is applied to the features that have been extracted and determines matching between the database of images from the manufacturer(s), prior positive matches, and the current extracted image to allow highly reliable product identification.

In one embodiment, the system can identify features of products using the AI training, and automatically generate descriptions of the product based on the features. The AI system can also automatically name the product based on the features. In one embodiment, a user can double check the AI generated name and description to ensure accuracy. The naming convention follows rules based on channel of trade and other factors. For example, Amazon and eBay may require limitations on the number of characters in a description, so the AI will use that knowledge to modify the naming and product description. The system will assign the product to a category based on features and apply a rule set. The system will also apply AI to help with SEO.

In one embodiment, the person taking images of the product will categorize the product manually, then the system will use a user configured rules-based algorithm to come up with a name/product title. For the product description, in one embodiment, the system uses an LLM AI model, for example ChatGPT, (although it could be any LLM) to generate the description based off an automatically generated prompt. In one embodiment, the prompt is made using the title, categories, bill of materials, metal data, brand, and the like.

In one embodiment, the system performs image editing as well, using AI. The untouched product image is stored in the system database and an AI image editor is used to make the background white (required for many channels of trade), do color correction, size the image, and the like, to make it suitable for use as part of an advertisement, posting on a website or channel of trade, placement in a catalog, or any other offer or presentation of the product.

Figure 14:
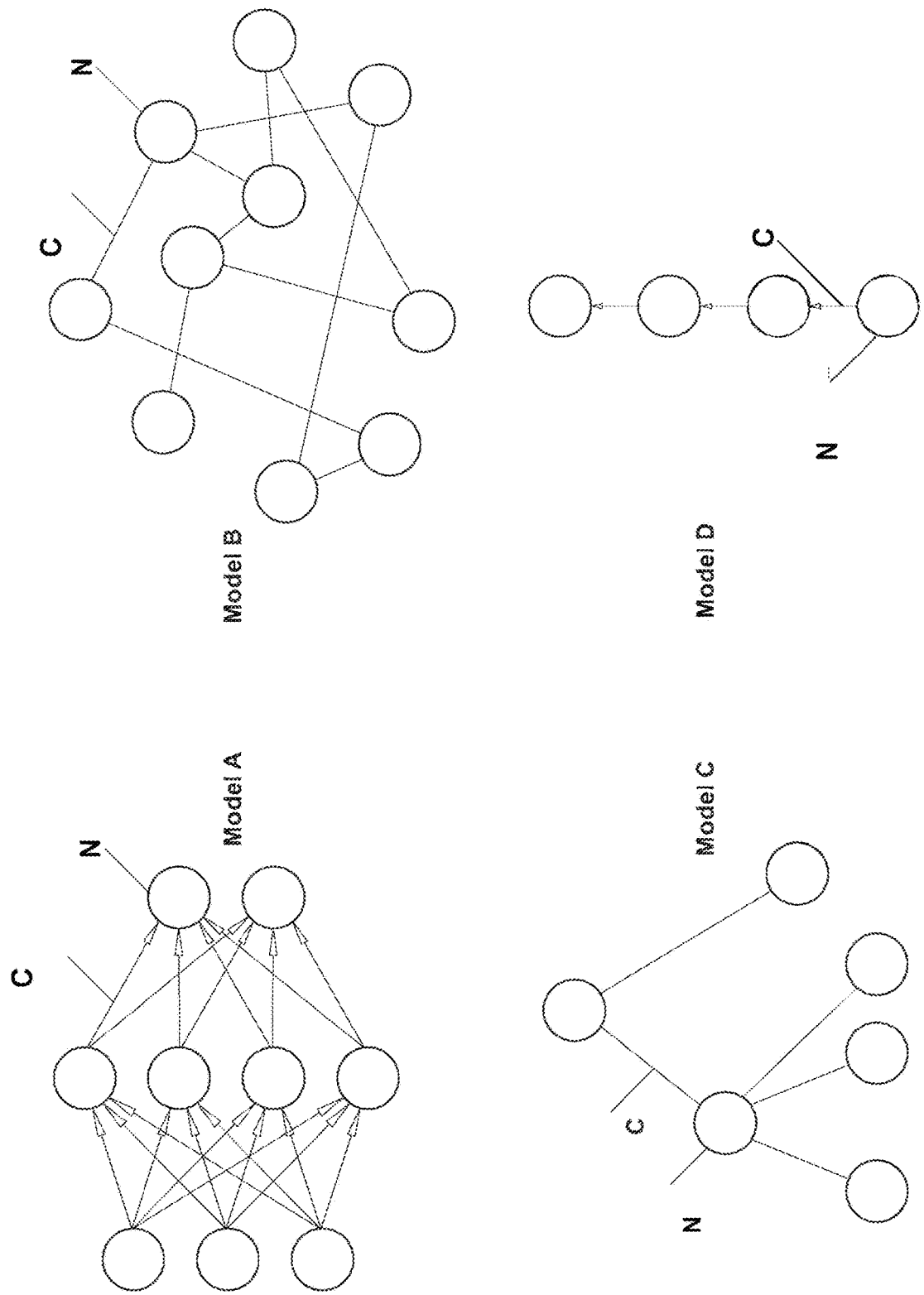
FIG. 14 is an example of neural network implementation in an embodiment of the system.

In one embodiment, the AI is implemented and trained as a neural network. An example neural network in an embodiment of the system is illustrated in FIG. 14. Referring to FIG. 14, the teaching presented by the disclosure can be implemented to include various artificial intelligence models ("AIMs") and/or techniques. The disclosed devices, systems, and methods for learning and using AIMs are independent of the artificial intelligence model and/or technique used and any model and/or technique can be utilized to facilitate the functionalities described herein. Examples of these models and/or techniques include deep learning, supervised learning, unsupervised learning, neural networks (i.e., convolutional neural network, recurrent neural network, deep neural network, etc.), search-based, logic and/or fuzzy logic-based, optimization-based, tree/graph/other data structure-based, hierarchical, symbolic and/or sub-symbolic, evolutionary, genetic, multi-agent, deterministic, probabilistic, statistical, and/or other models and/or techniques.

In one example shown in Model A, the disclosed devices, systems, and methods for learning and using AIMs may include a neural network (also referred to as artificial neural network, etc.). As such, machine learning, knowledge representation or structure, pattern recognition, decision making, and/or other artificial intelligence functionalities may include a network of Nodes N (also referred to as neurons in the context of neural networks, etc.) and Connections C similar to that of a brain. Node N can store any data, object, data structure, and/or other item, or reference thereto. Node N may also include a function for transforming or manipulating any data, object, data structure, and/or other item. Examples of such transformation functions include mathematical functions (i.e. addition, subtraction, multiplication, division, sin, cos, log, derivative, integral, etc.), object manipulation functions (i.e. creating an object, modifying an object, deleting an object, appending objects, etc.), data structure manipulation functions (i.e. creating a data structure, modifying a data structure, deleting a data structure, creating a data field, modifying a data field, deleting a data field, etc.), and/or other transformation functions. Connection C can store or be associated with a value such as a symbolic label or numeric attribute (i.e., weight, cost, capacity, length, etc.). A neural network can be utilized as a predictive modeling approach in machine learning. A computational model can be utilized to compute values from inputs based on a pre-programmed or learned function or method. For example, a neural network may include one or more input neurons that can be activated by inputs. Activations of these neurons can then be passed on, weighted, and transformed by a function to other neurons. Neural networks may range from those with only one layer of single direction logic to multi-layer of multi-directional feedback loops. A neural network can use weights to change the parameters of the network's throughput. A neural network can learn by input from its environment or from self-teaching using written-in rules.

In another example shown in Model B, the disclosed devices, systems, and methods for learning and using AIMs may include a graph or graph-like data structure. As such, machine learning, knowledge representation or structure, pattern recognition, decision making, and/or other artificial intelligence functionalities may include Nodes N (i.e., vertices, points, etc.) and Connections C (i.e., edges, arrows, lines, arcs, etc.) organized as a graph. A graph can be utilized as a predictive modeling approach in machine learning. In general, any Node N in a graph can be connected to any other Node N. A Connection C may include unordered pair of Nodes N in an undirected graph or ordered pair of Nodes N in a directed graph. Nodes N can be part of the graph structure or external entities represented by indices or references. Nodes N, Connections C, and/or operations of a graph may include any features, functionalities, and embodiments of the aforementioned Nodes N, Connections C, and/or operations of a neural network, and vice versa.

In a further example shown in Model C, the disclosed devices, systems, and methods for learning and using AIMs may include a tree or tree-like structure. As such, machine learning, knowledge representation or structure, pattern recognition, decision making, and/or other artificial intelligence functionalities may include Nodes N and Connections C (i.e., references, edges, etc.) organized as a tree. A tree can be utilized as a predictive modeling approach in machine learning. In general, a Node N in a tree can be connected to any number (i.e., including zero, etc.) of children Nodes N (i.e., similar to a tree, etc.). In some aspects, a collection of trees can be utilized where each tree may represent a set of related conversational paths such as, for example, paths concerning a topic or concept. Nodes N, Connections C, and/or operations of a tree may include any features, functionalities, and embodiments of the aforementioned Nodes N, Connections C, and/or operations of a neural network and/or graph, and vice versa.

In a further example shown in Model D, the disclosed devices, systems, and methods for learning and using AIMs may include a sequence or sequence-like structure. As such, machine learning, knowledge representation or structure, pattern recognition, decision making, and/or other artificial intelligence functionalities may include a structure of Nodes N and Connections C organized as a sequence.

In some aspects, Connections C may be optionally omitted from a sequence. A sequence can be utilized as a predictive modeling approach in machine learning. In some aspects, a sequence can be used to store a single data point. In other aspects, a sequence can be used to store multiple concatenated data points. Nodes N, Connections C, and/or operations of a sequence may include any features, functionalities, and embodiments of the aforementioned Nodes N, Connections C, and/or operations of a neural network, graph, and/or tree, and vice versa.

In yet another example the disclosed devices, systems, and methods for learning and using AIMs may include a search-based model and/or technique. As such, machine learning, knowledge representation or structure, pattern recognition, decision making, and/or other artificial intelligence functionalities may include searching through a collection of possible solutions. For example, a search method can search through a neural network, graph, tree, list, or other data structure that includes data elements of interest. A search may use heuristics to limit the search for solutions by eliminating choices that are unlikely to lead to the goal. Heuristic techniques may provide a best guess solution. A search can also include optimization. For example, a search may begin with a guess and then refine the guess incrementally until no more refinements can be made. In a further example, the disclosed devices, systems, and methods for learning and using AIMS may include logic-based model and/or technique. As such, machine learning, knowledge representation or structure, pattern recognition, decision making, and/or other artificial intelligence functionalities can use formal or other type of logic. Logic based models may involve making inferences or deriving conclusions from a set of premises. As such, a logic based system can extend existing knowledge or create new knowledge automatically using inferences. Examples of the types of logic that can be utilized include propositional or sentential logic that comprises logic of statements which can be true or false; first-order logic that allows the use of quantifiers and predicates and that can express facts about objects, their properties, and their relations with each other; fuzzy logic that allows degrees of truth to be represented as a value between 0 and 1 rather than simply 0 (false) or 1 (true), which can be used for uncertain reasoning; subjective logic that comprises a type of probabilistic logic that may take uncertainty and belief into account, which can be suitable for modeling and analyzing situations involving uncertainty, incomplete knowledge and different world views; and/or other types of logic In a further example the disclosed devices, systems, and methods for learning and using AIMs may include a probabilistic model and/or technique. As such, machine learning, knowledge representation or structure, pattern recognition, decision making, and/or other artificial intelligence functionalities can be implemented to operate with incomplete or uncertain information where probabilities may affect outcomes. A Bayesian network, among other models, is an example of a probabilistic tool used for purposes such as reasoning, learning, planning, perception, and/or others. One of ordinary skill in art will understand that the aforementioned artificial intelligence models and/or techniques are described merely as examples of a variety of possible implementations, and that while all possible artificial intelligence models and/or techniques are too voluminous to describe, other artificial intelligence models and/or techniques known in art are within the scope of this disclosure. One of ordinary skill in art will also recognize that an intelligent system may solve a specific problem by using any model and/or technique that works such as, for example, some systems can be symbolic and logical, some can be sub-symbolic neural networks, some can be deterministic or probabilistic, some can be hierarchical, some may include searching techniques, some may include optimization techniques, while others may use other or a combination of models and/or techniques. In general, any artificial intelligence model and/or technique can be utilized that can support AIM functionalities.

Prototyping Module 107

Figure 13:
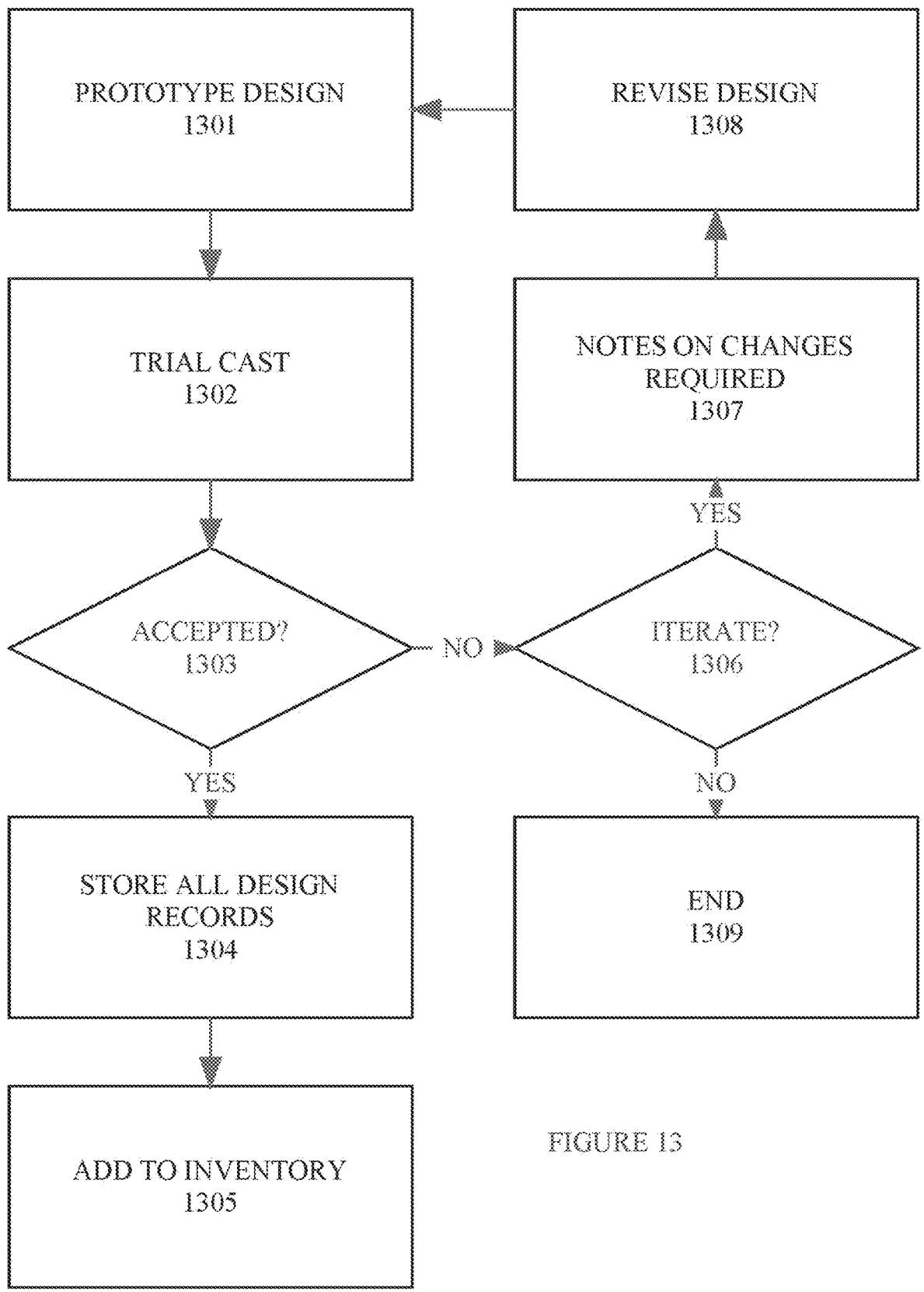
FIG. 13 is a flow diagram illustrating prototype development in an embodiment of the system.

When beginning the process of adding a new design, the system has a prototyping feature that can help track and document the design/prototyping process. FIG. 13 is a flow diagram of the prototyping process in an embodiment of the system. The designer can add designs, upload documents like hand drawings, CAD files, and the like, at prototype design step 1301. At step 1302 a trial cast of the design is made (e.g., in silver, gold, or other metals) and evaluated, with notes added regarding the design. At decision block 1303 it is determined if the design is accepted. If so, the complete design history is stored and associated with the new design at step 1304. At step 1305 the accepted design is added to the manufacturers inventory.

If a design is rejected at step 1303 it is determined if a new iteration is to be attempted at decision block 1306. If not, the process ends at step 1309. If there is to be a new iteration, the designer adds notes about problems with the designs, changes that are needed, and the like at step 1307. AT step 1308 the design is revised and the system returns to step 1301, you can add notes on why and then create a new iteration, and re-run the process until a design is accepted. This process and record keeping is useful for practical reasons. If a copyright dispute arises, the designer will have a full record of the design process—from inception to acceptance, that will show when a design was drawn, by who, and what early versions looked like. Another advantage of this process is that over enough iterations, the system can identify common reasons for rejection and incorporate the fixes into new design to improve the prototyping process.

Example Processing Embodiment

Figure 15:
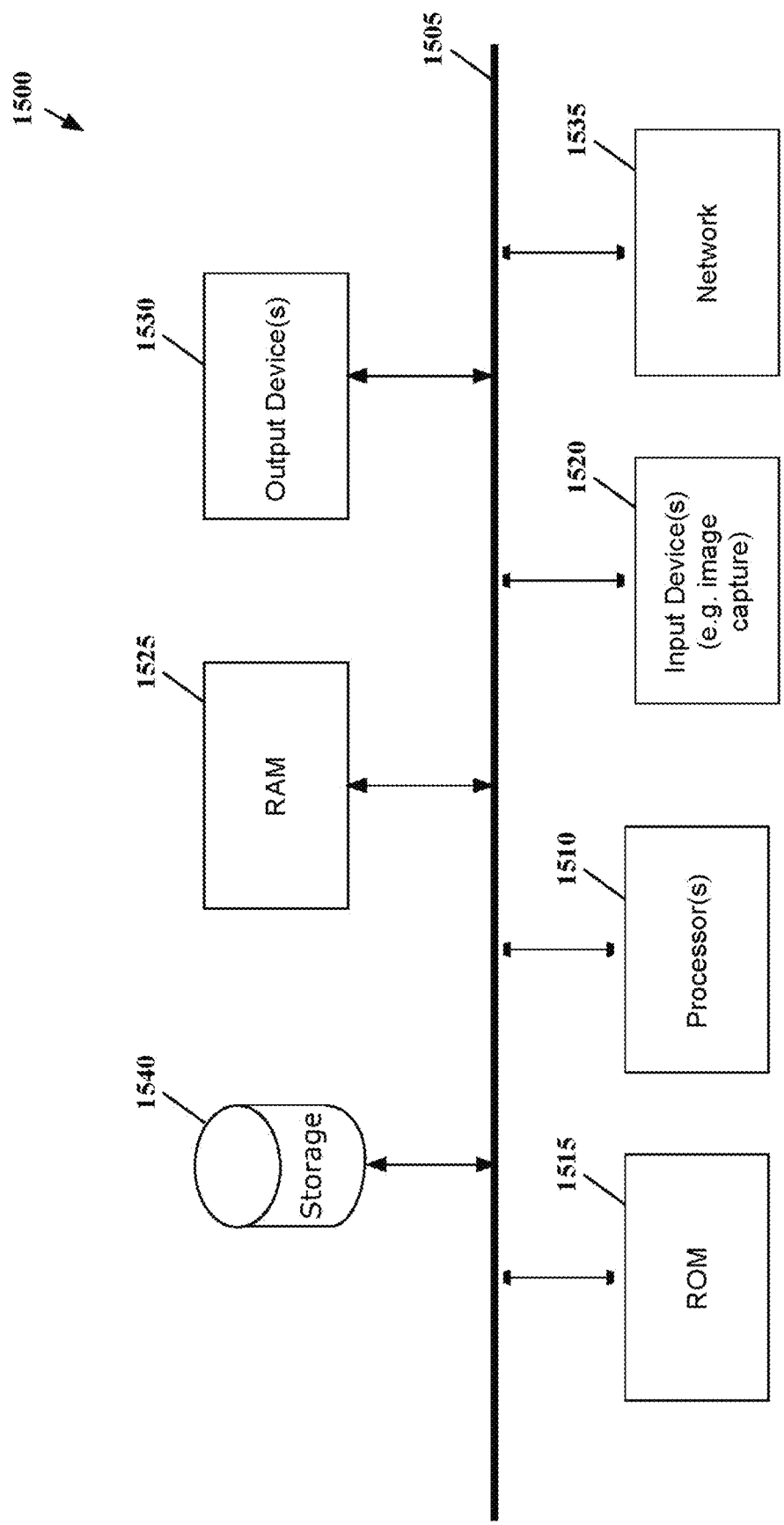
FIG. 15 is an example computer system in an embodiment of the system.

FIG. 15 illustrates an exemplary a system 1500 that may implement the system. The electronic system 1500 of some embodiments may be a mobile apparatus. The electronic system includes various types of machine readable media and interfaces. The electronic system includes a bus 1505, processor(s) 1510, read only memory (ROM) 1515, input device(s) 1520, random access memory (RAM) 1525, output device(s) 1530, a network component 1535, and a permanent storage device 1540.

The bus 1505 communicatively connects the internal devices and/or components of the electronic system. For instance, the bus 1505 communicatively connects the processor(s) 1510 with the ROM 1515, the RAM 1525, and the permanent storage 1540. The processor(s) 1510 retrieve instructions from the memory units to execute processes of the invention.

The processor(s) 1510 may be implemented with one or more general-purpose and/or special-purpose processors. Examples include microprocessors, microcontrollers, DSP processors, and other circuitry that can execute software. Alternatively, or in addition to the one or more general-purpose and/or special-purpose processors, the processor may be implemented with dedicated hardware such as, by way of example, one or more FPGAs (Field Programmable Gate Array), PLDs (Programmable Logic Device), controllers, state machines, gated logic, discrete hardware components, or any other suitable circuitry, or any combination of circuits.

Many of the above-described features and applications are implemented as software processes of a computer programming product. The processes are specified as a set of instructions recorded on a machine readable storage medium (also referred to as machine readable medium). When these instructions are executed by one or more of the processor(s) 1510, they cause the processor(s) 1510 to perform the actions indicated in the instructions.

Furthermore, software shall be construed broadly to mean instructions, data, or any combination thereof, whether referred to as software, firmware, middleware, microcode, hardware description language, or otherwise. The software may be stored or transmitted over as one or more instructions or code on a machine-readable medium. Machine-readable media include both computer storage media and communication media including any medium that facilitates transfer of a computer program from one place to another. A storage medium may be any available medium that can be accessed by the processor(s) 1510. By way of example, and not limitation, such machine-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a processor. Also, any connection is properly termed a machine-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects machine-readable media may comprise non-transitory machine-readable media (e.g., tangible media). In addition, for other aspects machine-readable media may comprise transitory machine-readable media (e.g., a signal). Combinations of the above should also be included within the scope of machine-readable media.

Also, in some embodiments, multiple software inventions can be implemented as sub-parts of a larger program while remaining distinct software inventions. In some embodiments, multiple software inventions can also be implemented as separate programs. Any combination of separate programs that together implement a software invention described here is within the scope of the invention. In some embodiments, the software programs, when installed to operate on one or more electronic systems 1500, define one or more specific machine implementations that execute and perform the operations of the software programs.

The ROM 1515 stores static instructions needed by the processor(s) 1510 and other components of the electronic system. The ROM may store the instructions necessary for the processor(s) 1510 to execute the processes provided by the system. The permanent storage 1540 is a non-volatile memory that stores instructions and data when the electronic system 1500 is on or off. The permanent storage 1540 is a read/write memory device, such as a hard disk or a flash drive. Storage media may be any available media that can be accessed by a computer. By way of example, the ROM could also be EEPROM, CD-ROM or other optical disk storage, magnetic disk storage or other magnetic storage devices, or any other medium that can be used to carry or store desired program code in the form of instructions or data structures and that can be accessed by a computer.

The RAM 1525 is a volatile read/write memory. The RAM 1525 stores instructions needed by the processor(s) 1510 at runtime, the RAM 1525 may also store the real-time video or still images acquired by the system. The bus 1505 also connects input and output devices 1520 and 1530. The input devices enable the user to communicate information and select commands to the electronic system. The input devices 1520 may be a keypad, image capture apparatus, or a touch screen display capable of receiving touch interactions. The output device(s) 1530 display images generated by the electronic system. The output devices may include printers or display devices such as monitors.

The bus 1505 also couples the electronic system to a network 1535. The electronic system may be part of a local area network (LAN), a wide area network (WAN), the Internet, or an Intranet by using a network interface. The electronic system may also be a mobile apparatus that is connected to a mobile data network supplied by a wireless carrier. Such networks may include 3G, HSPA, EVDO, and/or LTE.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other apparatuses, devices, or processes. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 18(f) unless the element is expressly recited using the phrase "means for" or, in the case of a method claim, the element is recited using the phrase "step for."

Thus, an improved method for manufacturing is described.

What is claimed is:

1. An integrated manufacturing management system comprising:
    a design/prototyping module for creating products; manufacturing at least one of the products;
    a material tracking module for tracking materials and byproducts of the materials used to manufacture the products, wherein the material tracking module uses statistical analysis to determine if excess material has been used, when compared to historical data;
    a sale tracking module for tracking sales of the products;
    an image recognition module for automatically creating catalog listings of the products;
    a shipping/packing module for automatically creating shipping labels; recording packing steps, and automatically determining shipping method for the products.

2. The system of claim 1 wherein the prototyping module uses historical data to automatically improve the revision process of unsuccessful prototypes of products.

3. The system of claim 1 wherein the image recognition module uses artificial intelligence (AI) trained on a plurality of different types of images to improve the efficiency of the AI.

4. The system of claim 3 wherein the AI uses a convolutional neural network (CNN) to separates a product from a background in an image.

5. The system of claim 3 further including an app to obtain an image of an unknown product for matching with a product in the catalog listing.

6. The system of claim 5 wherein the matching is accomplished using a K Nearest Neighbor (KNN) algorithm.

7. The system of claim 1 wherein the shipping/packing module utilizes cameras to record the products being packed for shipping to confirm accuracy and reduce shipping errors.

8. The system of claim 1 wherein the sale tracking includes channel of trade.

9. The system of claim 1 wherein the catalog listings are controlled by a rule set based on a channel of trade.

* * * * *